United States Patent
Orthlieb et al.

(10) Patent No.: US 9,735,613 B2
(45) Date of Patent: Aug. 15, 2017

(54) SYSTEM AND METHODS FOR CONTROLLING A SUPPLY OF ELECTRIC ENERGY

(71) Applicant: HEAT ASSURED SYSTEMS, LLC, Wallingford, PA (US)

(72) Inventors: Frederick L. Orthlieb, Wallingford, PA (US); Alan M. Letzt, Purcellville, VA (US); Erik A. Cheever, Media, PA (US); Tushar A. Parlikar, Somerville, MA (US); Ari Houser, College Park, MD (US)

(73) Assignee: HEAT ASSURED SYSTEMS, LLC, Wallingford, PA (US)

( * ) Notice: Subject to any disclaimer, the term of this patent is extended or adjusted under 35 U.S.C. 154(b) by 0 days.

(21) Appl. No.: 14/443,492

(22) PCT Filed: Nov. 19, 2013

(86) PCT No.: PCT/US2013/070743
§ 371 (c)(1),
(2) Date: May 18, 2015

(87) PCT Pub. No.: WO2014/078838
PCT Pub. Date: May 22, 2014

(65) Prior Publication Data
US 2015/0270743 A1    Sep. 24, 2015

Related U.S. Application Data

(60) Provisional application No. 61/727,778, filed on Nov. 19, 2012.

(51) Int. Cl.
*H05B 1/02* (2006.01)
*H02J 9/06* (2006.01)
(Continued)

(52) U.S. Cl.
CPC .................. *H02J 9/06* (2013.01); *H02J 3/00* (2013.01); *H02J 7/35* (2013.01);
(Continued)

(58) Field of Classification Search
CPC .......... H02J 9/06; H02J 3/00; H02J 2003/007; H02J 7/35; H05B 1/02; H05B 1/0233; H05B 2203/007; H05B 2203/005; Y10T 307/344; Y02B 10/72; Y04S 40/22; Y02E 60/76
(Continued)

(56) References Cited

U.S. PATENT DOCUMENTS 3,610,523 A    10/1971 Troy
4,065,676 A    12/1977 Elias
(Continued)

*Primary Examiner* — Mark Paschall
(74) *Attorney, Agent, or Firm* — Muir Patent Law, PLLC

(57) ABSTRACT

A system and methods for controlling the supply and distribution of backup electrical power determine when backup power is needed and allocates available backup power among connected devices in a power outage. Batteries may be used as an energy storage subsystem, and may backup a home heating plant and other devices based on a dual set of user-established priorities that may change during power blackouts and brownouts as the amount of stored energy decreases.

23 Claims, 9 Drawing Sheets

(51) Int. Cl.
*H02J 3/00* (2006.01)
*H02J 7/35* (2006.01)

(52) U.S. Cl.
CPC ......... *H02J 2003/007* (2013.01); *Y02B 10/72* (2013.01); *Y02E 60/76* (2013.01); *Y04S 40/22* (2013.01); *Y10T 307/344* (2015.04)

(58) Field of Classification Search
USPC ...... 219/483–487, 494, 497, 482; 307/38–41
See application file for complete search history.

(56) References Cited

U.S. PATENT DOCUMENTS

| | | |
|---|---|---|
| 4,071,745 A | 1/1978 | Hall |
| 4,111,357 A | 9/1978 | Mieczkowski |
| 4,127,107 A | 11/1978 | Melgeorge |
| 4,205,381 A | 5/1980 | Games et al. |
| 4,300,199 A | 11/1981 | Yoknis et al. |
| 4,347,712 A | 9/1982 | Benton et al. |
| 4,349,148 A | 9/1982 | Liberto et al. |
| 4,356,962 A | 11/1982 | Levine |
| 4,364,111 A | 12/1982 | Jocz |
| 4,381,075 A | 4/1983 | Cargill et al. |
| 4,474,325 A | 10/1984 | Richardson |
| 4,646,964 A | 3/1987 | Parker et al. |
| 4,673,826 A | 6/1987 | Masson |
| 4,695,246 A | 9/1987 | Beilfuss et al. |
| 4,725,001 A | 2/1988 | Carney et al. |
| 4,782,889 A | 11/1988 | Bourne |
| 4,844,335 A | 7/1989 | McKinley et al. |
| 4,845,416 A | 7/1989 | Scholl et al. |
| 4,931,948 A | 6/1990 | Parker et al. |
| 4,946,096 A | 8/1990 | Ballard et al. |
| 4,978,063 A | 12/1990 | Chase |
| 5,024,265 A | 6/1991 | Buchholz et al. |
| 5,051,936 A | 9/1991 | Gleason, III et al. |
| 5,085,401 A | 2/1992 | Botting et al. |
| 5,119,988 A | 6/1992 | Fiedrich |
| 5,131,623 A | 7/1992 | Giordani |
| 5,161,606 A | 11/1992 | Berkeley et al. |
| 5,203,497 A | 4/1993 | Ratz et al. |
| 5,226,454 A | 7/1993 | Cabalfin |
| 5,245,835 A | 9/1993 | Cohen et al. |
| 5,318,104 A | 6/1994 | Shah et al. |
| 5,337,952 A | 8/1994 | Thompson |
| 5,340,028 A | 8/1994 | Thompson |
| 5,408,573 A | 4/1995 | Jamieson et al. |
| 5,443,207 A | 8/1995 | Genga |
| 5,515,297 A | 5/1996 | Bunting |
| 5,540,414 A | 7/1996 | Giordani et al. |
| 5,542,603 A | 8/1996 | Macduff |
| 5,556,027 A | 9/1996 | Fiedrich |
| 5,592,989 A | 1/1997 | Lynn et al. |
| 5,622,221 A | 4/1997 | Genga, Jr. et al. |
| 5,622,310 A | 4/1997 | Meyer |
| 5,692,676 A | 12/1997 | Walker |
| 5,739,504 A | 4/1998 | Lyons et al. |
| 5,779,143 A | 7/1998 | Michaud et al. |
| 5,844,328 A | 12/1998 | Furst |
| 5,881,681 A | 3/1999 | Stuart |
| 6,062,485 A | 5/2000 | Stege et al. |
| 6,109,531 A | 8/2000 | Hollis |
| 6,115,276 A | 9/2000 | Mao |
| 6,186,471 B1 | 2/2001 | Genga et al. |
| 6,237,855 B1 | 5/2001 | Stickney et al. |
| 6,708,083 B2 | 3/2004 | Orthlieb et al. |
| 6,734,651 B2 | 5/2004 | Cook et al. |
| 6,747,371 B2 | 6/2004 | Kotlow et al. |
| 7,389,159 B2 | 6/2008 | Warren et al. |
| 7,424,343 B2 | 9/2008 | Kates |
| 7,547,990 B2 | 6/2009 | Varzhabedian |
| 7,659,697 B2 | 2/2010 | Jones et al. |
| 7,800,247 B2 | 9/2010 | Chang et al. |
| 7,999,666 B2 | 8/2011 | Barrieau et al. |
| 8,049,364 B2 | 11/2011 | Shakespeare et al. |
| 8,053,927 B2 | 11/2011 | Hjort et al. |
| 8,115,338 B2 | 2/2012 | Medugno |
| 8,227,937 B2 | 7/2012 | Barlock et al. |
| 8,269,374 B2 | 9/2012 | De Caires |
| 8,552,591 B2 | 10/2013 | Choi |
| 8,805,597 B2 * | 8/2014 | Steffes ................. G05B 15/02 219/485 |
| 2003/0167105 A1 | 9/2003 | Colborn |
| 2003/0213246 A1 | 11/2003 | Coll et al. |
| 2005/0162018 A1 * | 7/2005 | Realmuto ................. H02J 1/10 307/44 |
| 2007/0030613 A1 | 2/2007 | Sousa et al. |
| 2007/0228835 A1 | 10/2007 | Varzhabedian |
| 2007/0271006 A1 * | 11/2007 | Golden ................. H02J 3/14 700/295 |
| 2008/0266076 A1 | 10/2008 | Barrieau et al. |
| 2008/0272934 A1 | 11/2008 | Wang et al. |
| 2008/0296975 A1 | 12/2008 | Shakespeare et al. |
| 2009/0093916 A1 | 4/2009 | Parsonnet et al. |
| 2009/0212632 A1 | 8/2009 | Medugno |
| 2009/0295227 A1 | 12/2009 | Chang et al. |
| 2010/0006356 A1 | 1/2010 | Curry et al. |
| 2010/0017045 A1 | 1/2010 | Nesler et al. |
| 2010/0019577 A1 | 1/2010 | Barlock et al. |
| 2010/0284117 A1 | 11/2010 | Crane |
| 2010/0327656 A1 | 12/2010 | Humphrey et al. |
| 2011/0227415 A1 | 9/2011 | Hjort et al. |
| 2012/0046798 A1 | 2/2012 | Orthlieb et al. |
| 2012/0175955 A1 * | 7/2012 | Carralero ................. H02J 3/381 307/38 |
| 2012/0191262 A1 | 7/2012 | Marcus |
| 2012/0326504 A1 * | 12/2012 | Ballantine ............... H02J 3/006 307/24 |
| 2013/0175863 A1 | 7/2013 | Pan |

* cited by examiner

SYSTEM AND METHODS FOR CONTROLLING A SUPPLY OF ELECTRIC ENERGY

CROSS REFERENCE TO RELATED APPLICATIONS

This application claims the benefit of U.S. Provisional Application No. 61/727,778, filed Nov. 19, 2012, the disclosure of which is hereby incorporated in its entirety by reference.

BACKGROUND OF THE INVENTION

Field of the Invention

Preferred and non-limiting embodiments are related to a system and methods for controlling a supply of electric energy and, in particular, to a system and methods for home heating that enable a heating plant and other critical domestic equipment to run on stored energy from batteries during extended power outages.

Description of Related Art

Power outages that last 2-5 days or longer pose a serious risk to people, particularly in the cold winter months or hot summer months. Potential dangers include hypothermia, heat exhaustion, carbon monoxide poisoning, cardiovascular events, blunt trauma from falling objects such as tree limbs, and falls on ice.

Power outages during the winter months in the U.S. and other areas are caused by a variety of conditions. Ice storms are the predominant factor, causing downed lines from ice accumulation on trees and power lines. Blizzards, snow, and high winds are also weather conditions that can cause interruption of electric power. In addition, potential terrorist acts on the electric power grid during the winter could disable the delivery of electrical power to millions of residents during periods of extreme cold. All outages are of particular concern in the geographic areas where low temperatures and dangerous weather conditions can adversely impact public health. Table 1 shows examples of such winter storms in the U.S.

TABLE 1

Examples of U.S. Winter Storms and Related Power Outages

| Date | Area | Duration | Number of People Affected | Cause |
|---|---|---|---|---|
| January, 1993 | Washington State | 4 Days | 776,000 | Severe Wind |
| January, 1998 | NY State, Northeast | 2-3 Weeks | 500,000 | Ice |
| December, 2005 | Southern U.S. | Up to 5 Days | 700,000 | Ice |
| December, 2007 | Central & Eastern States | 10 Days | >1.5 Million | Ice, Sleet, Snow, Damaging Winds |
| December, 2008 | NY, New England, PA | >One Week | 1.25 Million | Ice |
| Jan. 27, 2009 | Central Plains, Midwest | >Two Weeks | 2.0 Million | Ice |

Winter storms are considered deceptive killers because most deaths are typically related to the storm only indirectly. The leading cause of death during winter storms is automobile and other transportation accidents. Exhaustion and heart attacks caused by overexertion are the next most likely causes of winter storm-related deaths. Elderly people account for the largest percentage of hypothermia victims. Many older Americans literally "freeze to death" or "die in the heat" in their own homes after being exposed to dangerously extreme indoor temperatures, or are asphyxiated because of improper indoor use of fuels, such as charcoal briquettes, which produce carbon monoxide. House fires occur more frequently in the winter due to lack of proper safety precautions when using alternate heating sources (unattended fires, disposal of ashes too soon, improperly placed space heaters, etc.). Fire during winter storms presents a great danger because local surface water sources may freeze over, and it may be difficult for firefighting equipment to get to the fire location.

Approaches sometimes taken by homeowners or tenants too often exacerbate the effects of an extended power outage. These include using one or more of standby or portable generators, kerosene heaters, and wood burning stoves. Stationary standby generators are costly to install properly, require regular maintenance and periodic exercise, an additional supply of fuel (that may run out during a long outage) and are subject to breakdowns. Portable generators are useful for temporary electric power, but are much less reliable and can also be dangerous. The primary dangers of using a portable generator are carbon monoxide (CO) poisoning from engine exhaust, electric shock and spilled-fuel fire. The use of unvented portable kerosene heaters in homes has significantly increased in recent years in response to higher heating fuel costs; however, misuse and abuse of kerosene heaters annually cause many deaths and injuries from CO poisoning and fires. Wood burning stoves can provide low cost space heat where firewood is cheap or free, but can and do cause contact burns and/or chimney fires if not used and maintained properly.

The following United States patents and United States patent application Publication are in the same field of and related to the present invention: U.S. Pat. Nos. 8,552,591; 8,269,374; 8,227,937; 7,800,247; 8,115,338; 7,999,666; 8,053,927; 8,049,364; 7,547,990; 7,389,159; and 2010/0017045.

SUMMARY OF THE INVENTION

Generally, provided is a system and methods for controlling a supply of electric energy that address or overcome some or all of the deficiencies and drawbacks associated with existing electric energy supply systems and methods.

Preferably, provided is a vastly simpler solution for, at least, homeowners or group-home owners than existing attempts and approaches. A system and methods described herein provide an intelligent power control system, for example, an Efficient, Robust Off-grid Home Heating System (EROHS), that enables a carefully specified heating plant and other critical but low-power domestic equipment (e.g., sump and well pumps, medical equipment, security equipment, communications and computer equipment) in a home to run on stored energy from batteries during extended power outages. The power control system includes an intelligent system controller that is normally supplied with utility power by a dedicated central heating or critical-operations circuit from a building's electrical distribution panel and connected in turn to one or more of the following: a heating plant, an energy storage subsystem, and one or more critical devices.

The power control system enables residents in a home or other structure that has lost grid power to maintain peace of mind knowing that they do not have to shovel their driveway, drive on hazardous roads, or else try to withstand low indoor temperatures. The power control system further offers peace of mind to family members elsewhere who can be assured that their loved one(s) will continue to have heat during an extended power outage and not have to engage in behaviors that may endanger their health or safety. With a power control system according to disclosed embodiments, when the electric power grid is down, the home heating system and other critical devices continue to operate normally using energy from the energy storage subsystem. When grid power is restored, the heating system and other critical devices may operate using either grid power or energy from the energy storage system.

A system controller supervises the operation of the building's heating system and certain other critical devices, during both grid-up and grid-down conditions, according to a combination of user-set priorities including the power demand of connected devices and the amount of energy remaining available in the storage subsystem. The system controller may be situated within the building's electrical distribution network, "downstream" of the main service disconnect and any service transfer switch, on a dedicated circuit that is not subject to control signals dispatched by the electric utility via a so-called Smart Meter. The system controller may be instructed by the homeowner using any of several means indicated below to accept, set, and adaptively change operating conditions and priorities to be implemented during utility grid outages for the heating system and/or those connected critical devices.

The up/down condition of utility grid power at the building distribution circuit supplying the system controller, together with the state of a dedicated energy storage subsystem located on the same premises, and information on status and power demand of connected loads, constitute a basis for controlled operation and prioritization of the connected heating system and critical devices.

The connected heating system may have its own integrated control components and operating scheme assuring safety, efficiency, and comfort. The system controller operates in a supervisory mode with respect to the heating system controller and may be configured to modify certain of that controller's inputs or settings, depending upon the homeowner's instructions to the system controller, the status of utility power supply, the availability of any standby generator power, and the state of the local energy storage subsystem, in ways that do not compromise the safety or integrity of heating system controller operation or risk damage to connected critical devices.

Alternatively, the system controller may act as a programmable heating system controller, receiving various sensor, status, and safety device inputs and safely dispatching operating power and signals to heating system components and equipment. The homeowner's instructions for both the connected heating system and the connected critical devices may be implemented in the usual supervisory mode.

The system controller differs from conventional backup controllers at least in that the system controller accepts and implements operating priorities for the heating system and connected devices on a dual basis: one part based upon real-time total power demand of the heating system and connected devices relative to the capacity of the power source then in use, and the other part based upon the level of stored energy then remaining.

Because a centrally-heated residence typically has a thermal time constant in the range of several hours, whereas most connected critical devices, e.g., a sump or well pump, typically operate sporadically for no longer than a few minutes, best management of the stored energy resource during grid-down conditions when no standby power is available is to avoid high total power demand by temporarily giving priority to short-duration device calls, and operating the heating system (in a most efficient, low power mode if one is available) only as needed during intervals between device calls. This operating routine includes features to prevent short-cycling of the heating system or interrupting its safety-critical burner pre/post purge and ignition/lightoff phases.

Moreover, the dual-basis system controller scheme recognizes that user priorities during an outage for heating and for operation of connected devices may differ from those at its outset. This is especially true for an outage expected to be of a duration long enough to require greater than usual restriction of total power demand if heating and/or the most critical device functions are to be maintained, even at reduced levels, throughout the outage or until standby power and then stored energy are exhausted. Systems and methods for controlling a supply of electrical energy according to disclosed embodiments may accordingly be distinguished from other heating-plus-energy storage system controllers at least on a basis of its dual-basis scheme.

According to a preferred and non-limiting embodiment, the system controller includes a heating system controller. The system controller is coupled to a power distribution circuit, a heating plant with one or more high-voltage (generally 120 VAC) power loads, one or more energy storage systems, and one or more critical devices. The system controller includes switches electrically coupled to the heating system and to each critical device, and typically directs power from the grid to the heating system and the critical devices when the grid is up, and from available standby generator power and then the energy storage subsystem to the heating system and critical devices when the grid is down. The system controller may direct power from the energy storage system when the grid is up. Switches on the supply and distribution sides of the system controller may include any number of: a transfer switch, a fuse, a circuit breaker, a mechanical relay, and/or a solid-state relay.

The system controller includes at least one processor. The processor is configured to monitor the condition of the heating plant and the critical devices, determine whether a power outage is occurring, and in response to determining that an outage is occurring, cause the system controller to draw power from the energy storage subsystem and appropriately manage the heating system and the connected critical devices.

According to another preferred and non-limiting embodiment, the processor determines whether a power outage is occurring by monitoring one or more power distribution network parameters, e.g., grid voltage and/or current. The processor may further monitor one or more energy storage subsystem parameters, e.g., the quantity of energy stored or a value associated with the state of charge of the energy storage system. If the energy storage subsystem comprises a battery bank, the value associated with the state of charge of the energy storage system may be battery terminal voltage. The processor may monitor a condition of a heating plant component, e.g., a thermostat, a zone valve or damper, a circulating pump or blower, an oil primary control or gas valve, a combustion blower, and/or any safety device. The system controller may detect whether or not a thermostat calls for heat. If the processor detects a thermostat heat call, the processor may switch a heating plant circulator, burner, and corresponding zone valve or damper to an active state. If the processor detects that a thermostat heat call has ceased, the processor may switch a heating plant circulator, boiler, or burner, and/or the corresponding zone valve or damper to an inactive state. The processor may be configured to estimate and display remaining power outage "run through" capability.

According to a preferred and non-limiting embodiment, the system controller includes a communications network interface, and the processor is configured to communicate, via the network interface, one or more parameters of the heating plant, critical devices, and/or the energy storage subsystem to a remote device, e.g., a mobile telephone, a smart-phone, a computer, and/or a server, on a communication network. The parameters may include a state of the energy storage subsystem, a condition of the critical device(s), and/or a condition of the heating plant, e.g., a condition of a thermostat, zone valve or damper, circulator, burner, and/or safety switch. The network interface may include a wireless adapter and/or a network interface card. The wireless adapter may be configured to use the IEEE 802.15, IEEE 802.11, or other commercially-used protocol for network communications.

The system controller may also include a local user interface that includes an input means and a display. The processor may be configured to receive user inputs from the user interface. The display may include an LCD, LED, or other display technology or voice input technology. The input means may include pushbuttons, a keypad, a keyboard, a mouse, a touch screen, a microphone, a cell or smart phone, a web browser, or another technology. The user input may include an indication of a desired condition, such as an active or inactive state, for any of several switches associated with a heating plant circulator, burner, or zone control, an energy storage subsystem charger, an inverter, and/or a critical device. The user interface display may display or announce one or more parameters of the heating plant, the energy storage system, and/or the critical device, e.g., a state of charge of the energy storage subsystem, a condition of the critical devices, and/or a condition of the heating plant. The condition of the heating plant may include the condition of a heating plant thermostat, zone valve or damper, circulator pump or blower, burner, boiler or furnace, and/or a safety device.

The heating plant may include, in addition to high voltage loads, one or more low-voltage loads. The low-voltage loads may be powered by AC or DC, and may include a thermostat, a zone valve or damper, pump, blower, and/or an alert device, which in turn may include an audio and/or visual alarm. High-voltage heating system loads may be powered by 110 or 220 volt alternating current, or by direct current at more than 50 volts, and may include a heating plant circulator, blower, burner, boiler or furnace, an energy storage subsystem charger, a heating plant safety device or switch, and/or one or more critical devices.

According to another preferred and non-limiting embodiment, critical devices conventionally supplied from high voltage AC outlets via small external low voltage DC power supplies may instead be supplied directly by the power control system with low voltage DC in order to reduce power loss and extend off-grid operating capability.

According to a preferred and non-limiting embodiment, the processor is configured to cause charging of the energy storage subsystem from the utility power distribution network or available standby generator power based on one or more charging parameters, e.g., the current outage condition and/or the quantity of energy remaining in the energy storage subsystem.

According to a preferred and non-limiting embodiment, a system for controlling a supply of electrical energy may include a system controller comprising a processor configured to control a supply of electrical energy from an electrical energy source to at least one device based at least partly on a power demand of the at least one device relative to an electrical power delivery capacity of an electrical power delivery mechanism and an amount of electrical energy currently stored in an energy storage subsystem.

According to another preferred and non-limiting embodiment, a method for controlling a supply of electrical energy may include receiving, by a system controller comprising a processor, information on a power demand of at least one device and information on an amount of electrical energy stored in an energy storage subsystem. The system controller may control a supply of electrical energy from an electrical energy source to the at least one device based at least partly on the information on the power demand of the at least one device relative to an electrical power delivery capacity of an electrical power delivery mechanism and the information on the amount of electrical energy currently stored in the energy storage subsystem.

According to still another preferred and non-limiting embodiment, a non-transitory computer readable medium storing a computer program which when executed by a processor of a computer performs a method for controlling a supply of electrical energy including receiving information on a power demand of at least one device and information on an amount of electrical energy stored in an energy storage subsystem; and controlling a supply of electrical energy from an electrical energy source to the at least one device based at least partly on the information on the power demand of the at least one device relative to an electrical power delivery capacity of an electrical power delivery mechanism and the information on the amount of electrical energy currently stored in the energy storage subsystem. The system controller may be configured to control the supply of electrical energy from the electrical energy source to the at least one device and the energy storage subsystem based at least partly on an aggregate of the power demand of the at least one device and a power demand for charging the energy storage subsystem relative to the electrical power delivery capacity of the electrical power delivery mechanism and the amount of electrical energy currently stored in the energy storage subsystem.

The electrical energy source may comprise an electric power grid, a solar photovoltaic energy system, a standby electrical generator, and/or the energy storage subsystem. The electrical energy source may further comprise a power source separate from the energy storage subsystem.

The system controller may be configured to determine a state of the power source and control the supply of electrical energy from the electrical energy source to the at least one device based on the state of the power source. If the system controller determines that the state of the power source is unavailable, the supply of electrical energy from the electrical energy source is supplied from only the energy storage subsystem. If the system controller determines that the state of the power source is available, the system controller is configured to control the supply of electrical energy from the electrical energy source such that the energy storage subsystem is charged by a portion of the supply of electrical energy from the electrical energy source supplied by the power source if the amount of electrical energy currently stored in the energy storage subsystem is below a storage threshold.

The at least one device may comprise a heating system. The heating system may comprise a hydronic heating system. The heating system may comprise a plurality of different components, and the system controller may individually control the supply of the electrical energy from the electrical energy source to each individual component of the plurality of different components.

The system controller may be configured to determine if an equipment failure has occurred in the heating system, and the system controller may be configured to disable the heating system if the equipment failure is determined to have occurred.

The system controller may be configured to determine if a heating system temperature violates a threshold temperature, and the system controller may be configured to disable or reduce a heat production of a heat producing element of the heating system if the heating system temperature is determined to violate the threshold temperature.

The heating system may comprise at least one heating zone. The system controller may be configured to receive a current temperature of the at least one heating zone from the heating system and control a supply of heat to the at least one heating zone based at least partly on the current temperature of the at least one heating zone. The at least one heating zone may be a plurality of different heating zones.

The system controller may be configured to control the supply of heat to the plurality of different heating zones by controlling a plurality of different switches associated with the plurality of different heating zones.

The heating system may comprise a heat controller configured to receive a current temperature of the at least one heating zone from the heating system, and the heat controller may be configured to control a supply of heat to the at least one heating zone based at least partly on the current temperature of the at least one heating zone.

The system controller may be configured to determine if a temperature of a heat producing element of the heating system is above a minimum temperature and increase a heat production of the heat producing element if the temperature of the heat producing element is below the minimum temperature. If the system controller determines that the temperature of the heat producing element of the heating system is above the minimum temperature, the system controller is configured to determine if a time threshold is reached, and wherein the system controller is configured to disable the heating system if the time threshold is reached.

The at least one device may comprise a plurality of different devices.

The electrical power delivery mechanism may comprise an inverter configured to convert at least a portion of the supply of electrical energy from the energy storage subsystem to at least a portion of the plurality of different devices from DC electrical energy to AC electrical energy.

The system controller may be configured to individually control the supply of electrical energy from the electrical energy source to each individual device of the plurality of different devices.

Each of the plurality of different devices may be associated with a priority level, and the system controller may be configured to control the supply of electrical energy from the electrical energy source to each device of the plurality of different devices based at least partly on the priority level of said each device. The priority level of each device of the plurality of different devices may be assigned based on user input.

The priority level of each device may comprise a first threshold and a second threshold. The system controller is configured to control the supply of electrical energy from the power source to said each device based on a comparison of the first threshold of the device to a current total system power demand, and the system controller is configured to control the supply of electrical energy from the energy storage subsystem to said each device based on a comparison of the second threshold of the device to the current total system power demand.

The first threshold may be higher than the second threshold. The system controller may be configured to provide the supply of electrical energy from the energy storage subsystem only when the state of the power source is unavailable. When the state of the power source is available, the system controller is configured to enable said each device to receive the supply of electrical energy if the current total system power demand is below the first threshold of the device and disable the device to not receive the supply of electrical energy if the current total system power demand is above the first threshold of the device. When the state of the power source is unavailable, the system controller is configured to enable said each device if the current total system power demand is below the second threshold of the device and disable the device if the current total system power demand is above the second threshold of the device.

Each device of the plurality of different devices may be associated with a shutdown level. The system controller may be configured to disable said each device of the plurality of different devices when the amount of electrical energy currently stored in the energy storage subsystem violates the shutdown level of the device.

At least a portion of the plurality of different devices may be associated with a lock-in duration, the lock-in duration of a device defining a time period from a prior enablement of the device during which the device cannot be disabled by the system controller. At least a portion of the plurality of different devices may be associated with a lock-out duration, the lock-out duration of a device defining a time period from a prior disablement of the device during which the device cannot be enabled by the system controller.

The electrical energy source may comprise the energy storage subsystem and a power source separate from the energy storage subsystem.

an interface device configured to receive user input data from a user and transmit the user input data via a communications network to the system controller, wherein the system controller is configured to adjust the control of the supply of electrical energy from the electrical energy source to the at least one device based on the user input data.

According to another preferred and non-limiting embodiment, the energy storage subsystem may be charged by one or more non-utility sources, e.g., a standby generator, a solar photovoltaic array, a wind power generator, or micro-hydro equipment. The system controller may sense as usual the state of charge of the energy storage subsystem and adjust its control priorities and capabilities estimates accordingly. The energy storage subsystem may include a battery system, e.g., a lithium-based battery, a lead-acid battery, or a double-layer capacitor.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Further features and other objects and advantages will become apparent from the following detailed description made with reference to the drawings in which.

DESCRIPTION OF THE INVENTION

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that may be wired and/or wireless in nature. Additionally, two units or components may be in communication with each other even though the data transmitted may be modified, processed, routed, and the like, between the first and second unit or component. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible.

Figure 1:
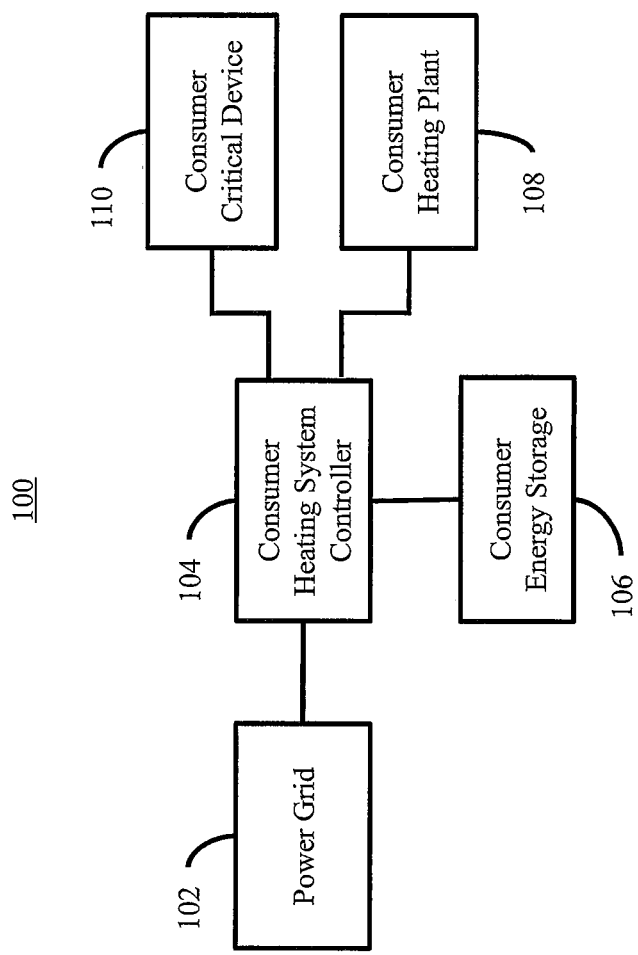
FIG. 1 is a diagram of an illustrative home heating system according to a preferred and non-limiting embodiment of the invention.

FIG. 1 depicts a system 100 for efficiently and reliably heating a home. A system controller 104 is linked to a power distribution network/grid 102 and a consumer energy storage subsystem 106. The system controller 104 is further linked to a consumer heating plant 108, and may be linked to one or more consumer critical device(s) 110. The consumer energy storage subsystem 106 and the consumer heating plant 108 are discussed in more detail in relation to FIGS. 2-3, below. The system controller 104 may control the flow of power between the power distribution network/grid 102, the consumer energy storage subsystem 106, the consumer heating plant 108, and the consumer critical device(s) 110, and is discussed in further detail below in relation to FIGS. 4-5.

Figure 2:
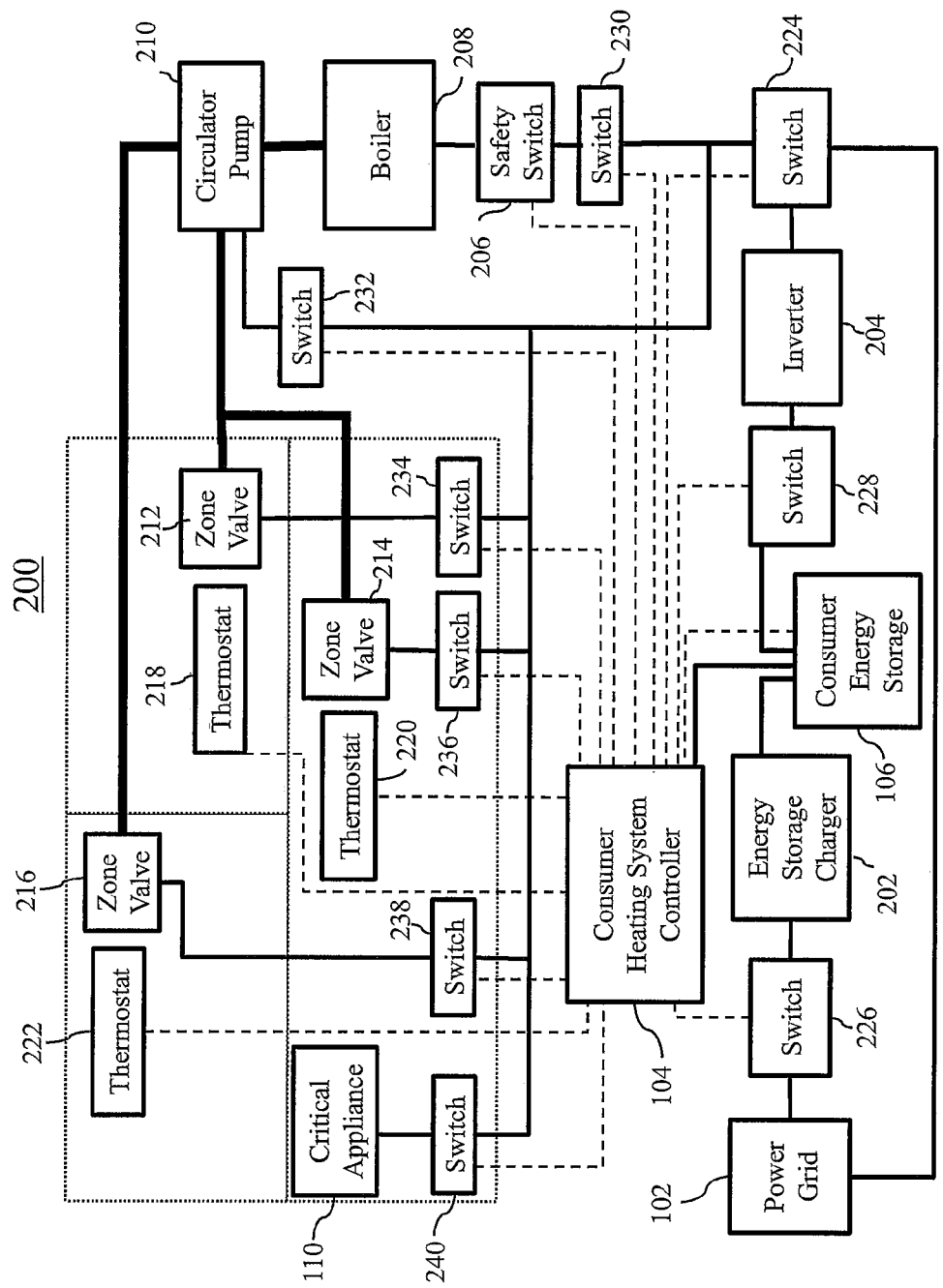
FIG. 2 is a detailed diagram of a first illustrative home heating system according to a preferred and non-limiting embodiment of the invention.

FIG. 2 depicts an illustrative home heating system 200 according to an embodiment of the invention. The home heating system 200 includes a system controller 104, a consumer energy storage subsystem 106 linked to a power distribution network/grid 102, and one or more critical device(s) 110, similar to the similarly-denoted items shown in FIG. 1. FIG. 2 is in the style known in the electrical trade as a One Line Diagram, in which flows of power, fluid or signals are nominally bidirectional. Electric power circuits are indicated by single thin, solid black lines, water flow circuits are depicted by single heavy, solid black lines, and communicative couplings are indicated by single dashed black lines.

The home heating system 200 includes a hydronic (forced hot water) heating plant, as a common example of the consumer heating plant 108 depicted in FIG. 1. This heating plant preferably includes a high-efficiency, modulating condensing boiler 208 with low water-side flow resistance having its own internal controller, a single highly efficient circulator pump 210, zero or more low power zone valves 212-216, and one or more self-powered thermostats 218-222.

Each zone valve 212-216 is located on or near the boiler supply manifold, and controls heated water flow from that manifold through a pipe circuit that delivers heat through a heat emitter in its particular zone and returns cooler water to the boiler return manifold and thence to the circulator pump 210, through which water pressure is increased and the flow returned to the boiler 208 for reheating. A home heating system according to a preferred and non-limiting embodiment may differ from conventional multizone hydronic systems in that only one (highly efficient) circulator pump is used—a feature advantageous to achieving low electrical operating power demand.

Each thermostat 218-222 and zone valve 212-216 is associated with a heating zone (denoted in FIG. 2 by large dotted boxes). However, if there is only one heated zone, a single thermostat and no zone valve are used. In multizone systems, one of the zones may be configured to heat domestic hot water, and such a zone may have priority over other heating zones.

When any thermostat detects that its particular zone is to be heated or not heated, it communicates with the system controller 104, which then controls the boiler 208, the circulator pump 210, and the appropriate zone valve in order to provide heating or to cease heating. The heating plant also includes one or more safety devices 206, which may be configured to cut all power to the heating plant if a plant malfunction is detected. The heating process is described in further detail below, in relation to FIG. 7.

In preferred and non-limiting embodiments, critical device(s) 110 and each component of the heating plant, e.g., the boiler 208, the circulator pump 210, and the zone valves 212-216, may receive electrical power from the energy storage system via an inverter 204 and/or from the power grid 102 via a source-selector switch 224. Critical devices and/or heating plant components that require relatively low AC or DC voltages, e.g., the zone valves 212-216, may receive electrical power directly from the system controller 104. The system controller 104 may control the flow of power to each heating plant component or critical device that receives electrical power from the energy storage system 106 and/or the power grid 102 by controlling switches 230-240. Each switch 230-240 controls power to a single heating plant component or critical device. Because each switch 230-240 controls power to a single heating plant component or critical device, the system controller 104 can turn individual devices/heating plant components on or off by switching the corresponding switch to an active state (on) or to an inactive state (off), without affecting the other devices or heating plant components.

The consumer energy storage system 106 includes one or more energy storage elements, e.g., batteries or double-layer capacitors (not shown). For example, the consumer energy storage subsystem 106 may include batteries configured to operate as an energy storage system, e.g., batteries linked in a parallel and/or series configuration. In preferred and non-limiting embodiments, the consumer energy storage subsystem 106 may include absorbent glass mat (AGM) lead-acid batteries connected in parallel and/or in series. For example, SunXtender batteries, e.g., PVX-2240T batteries manufactured by Concorde Battery Corporation, West Covina, Calif. may be used. The number and type of batteries used in the consumer energy storage subsystem 106 may be based on the power consumption and desired grid-down operational duration of the home heating system 200 and any critical devices 110. For example, if the home heating system 200 together with critical devices 110 consume an average of 100 W, and the desired operational duration is seventy-two hours, batteries in the energy storage subsystem 106 may be selected to provide 7.2 kilowatt-hours available storage capacity. In another preferred and non-limiting embodiment, any other suitable type of battery or batteries may be used, and the number and type of batteries used in the consumer energy storage subsystem 106 may be based on any other suitable factor or variable. The number and type of batteries used in the consumer energy storage subsystem 106 may be based on the total quantity of electrical energy that should be stored in order to meet the desired operational duration. For example, if eight kilowatt-hours of energy is to be stored in order to operate the system 200 and critical devices 110, the number and type of batteries in the consumer energy storage subsystem 106 may be selected to store eight kilowatt-hours of energy. The number and type of batteries used in the consumer energy storage subsystem 106 may be based on the total maximum instantaneous power that is required from the energy storage subsystem 106 by the system 200 and any critical devices 110. For example, if the consumer energy storage subsystem 106 needs to provide a maximum of one kilowatt at a particular time, the batteries in the energy storage subsystem 106 may be sized and selected to provide this level of output power.

In a preferred and non-limiting embodiment, the batteries in the consumer energy storage subsystem 106 may be selected and sized based on the desired duration of system operation. For example, if the system 200 (and any critical devices 110) is to operate for ninety-six hours, the batteries in the consumer energy storage subsystem 106 may be selected to provide sufficient power for ninety-six hours. The batteries in the consumer energy storage subsystem 106 may be selected based on a desired system reliability lifetime. The batteries may also be sized and selected based on two or more of the factors described above, or any other relevant factor. The consumer energy storage subsystem 106 may include processing circuitry configured to monitor the performance and condition of the consumer energy storage subsystem 106 and/or the energy storage elements included in the energy storage subsystem 106.

The energy storage subsystem 106 may include energy storage elements other than batteries, as well as converters for converting electrical energy into other forms of energy. For example, the energy storage subsystem 106 may include capacitors to store energy as electricity, kinetic energy storage (e.g., flywheels), thermal energy storage (e.g., thermal reservoirs), and/or potential energy storage (e.g., elevated masses or loaded springs). The energy storage subsystem 106 may also store energy by converting electricity into other products, such as hydrogen (e.g., by electrolysis of water).

The consumer energy storage subsystem 106 is linked to the power grid 102 by an energy storage charger 202 and a switch 226 communicatively coupled to the system controller 104. The system controller 104, which is communicatively coupled to the consumer energy storage subsystem 106, monitors the consumer energy storage subsystem 106 and controls the charging of the energy storage subsystem 106 by controlling the switch 226. For example, if a consumer desires to operate the heating system 200 only on stored energy, the system controller 104 may switch the switch 226 to an inactive state, thus disconnecting the power grid 102 from the consumer energy storage subsystem 106. When the switch 226 is in the active state, the energy storage charger 202 controls the charging of the energy storage subsystem 106 from the power distribution grid. The energy storage charger 202 may include circuitry configured to convert power provided from the grid 102 into power suitable for charging the energy storage subsystem 106. For example, the charging system 202 may be configured to convert alternating current (AC) electricity into direct current (DC) electricity, or vice versa.

The consumer energy storage subsystem 106 is linked to other components of the heating system 200 via the inverter 204. The system controller 104 may control the connection between the energy storage subsystem 106 and the inverter 204 via a switch 228. By switching the switch 228 from an active state to an inactive state, the controller 104 can disconnect the energy storage system 106 from the inverter 204. Alternatively, the switch 228 may include a fuse or circuit breaker and/or a manual switch, and may not be controlled by the system controller 104.

The inverter 204 may convert power provided by the consumer energy storage subsystem 106 into power suitable for critical device(s) 110 and/or other components of the heating plant. For example, the consumer energy storage subsystem 106 may provide DC electricity, whereas one or more of the critical device(s)/heating system components may require AC electricity. The inverter 204 converts the DC electricity from the storage subsystem 106 into AC electricity.

The system controller 104 may control the flow of power to the heating plant from the inverter 204 or the power grid 102 via the switch 224. The switch 224 may connect the inverter 204 to the heating plant in a first configuration, connect the power grid 102 to the heating plant in a second configuration, and disconnect or isolate the heating plant from both the inverter 204 and the power grid 102 in a third configuration. The switch 224, however, need not provide any connection to the power grid 102, and may only connect/disconnect the inverter 204 to the heating plant.

The critical device(s) 110 may include one or more electrically powered devices that have been deemed important by the consumer. For example, critical devices may include a sump pump, a water well pump, small household appliances, and other devices e.g., small medicine-refrigerators, computers, Internet routers and modems, home security systems, and/or any other electrically powered household devices. The critical device(s) 110 may include one or more medically necessary electrical devices, e.g., ventilators, oxygen concentrators, dialysis machines, or any other devices. The critical device(s) 110 may represent household circuits instead of individual devices, and thus may represent multiple actual devices plugged into a properly identified common "backed-up" critical operations circuit.

The switches 224-240 may be controlled locally and/or remotely. For example, the switches 224-240 may be controlled locally by a consumer manually actuating the switches, or remotely via hard-wired connections (e.g., Ethernet, USB, serial/parallel, and/or power line connections), or wireless connections (e.g., Zigbee [IEEE 802.15], WiFi [IEEE 802.11], cellular/satellite networks, and/or RF/IR). The switches 224-240 may include one or more of a solid-state relay, mechanical relay, power MOSFETs, IGBTs, JFETs, transfer switches, or any suitable power switching device. Transfer switches may be used to switch between grid power and stored power. Examples of transfer switches may include 32311-189EF switches manufactured by GenTran Corporation, Alpharetta, Ga.; 32315-UTS6BI switches manufactured by APC Corporation, W. Kingston, R.I.; and/or 32316-30216A1 switches manufactured by Reliance Control Corporation, Racine, Wis. Any other suitable transfer switches may be used. Power MOSFETs, IGBTs, and JFETs may be used to control the power flow from grid power and/or stored power to individual (or multiple) devices or heating system components. Examples of suitable switches may include RFP15N15 switches manufactured by Intersil Corporation, Milpitas, Calif., and/or 2N6756 switches manufactured by Fairchild Semiconductor, South Portland, Me. Any other suitable power switches may be used. Any of the switches may be controlled by the system controller 104.

Figure 3:
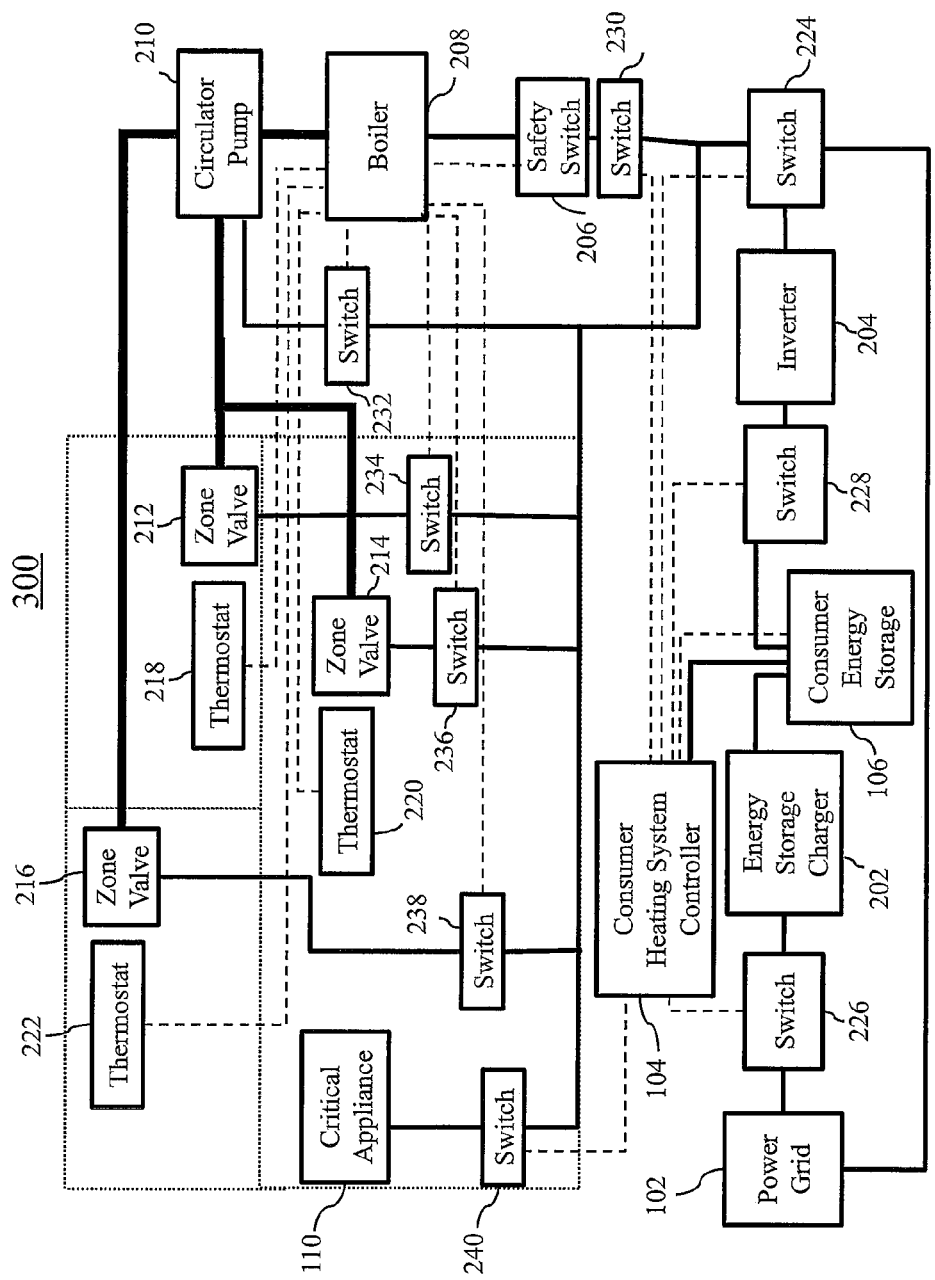
FIG. 3 is a detailed diagram of a second illustrative home heating system according to another preferred and non-limiting embodiment of the invention.

FIG. 3 is a detailed diagram of an illustrative home heating system 300, according to a preferred and non-limiting embodiment. The home heating system 300 and its components are similar to home heating system 200 and its components, described above in relation to FIG. 2. However, in heating system 300, the boiler 208 is configured with control circuitry for receiving information from thermostats 218-222 and controlling switches 232-238. The boiler 208 and its associated control circuitry receive input from system thermostats and determine the operating state of each of the components in the heating plant, but do not interact with any critical device(s) 110, whose control remains with the system controller 104. The boiler 208 is responsible for communicating with the safety switch 206 and shutting off power to the heating plant if a malfunction occurs. The system controller 104 controls the energy storage subsystem 106, the charger 202, and associated switches 226-228, although the switch 228 may function as a fuse box/switch not directly controlled by the system controller 104. The system controller 104 may also control the switch 224, which may control power flow between the inverter 204 or the power grid 102 and the heating plant.

In the heating systems 200 and 300, switching between grid power and stored power may occur during brownout or blackout situations in order to provide backup power to the heating plant and/or critical device(s) 110. The system controller 104 may be configured to measure a level of power received by a consumer from the power distribution grid 102, and in response to the measurement, determine if a brownout or blackout condition exists. If a brownout or blackout condition exists, or if there is a reason for not using available grid power at a particular time (e.g., managing peak electrical loads), the heating plant and/or critical device(s) 110 are powered by the energy storage subsystem 106.

Each of the elements described above may be configured to communicate with a network (not shown). The network may be a local area network, a wide area network, or the Internet. In some embodiments, the network may be interfaced with a supervisory control and data acquisition (SCADA) system, e.g., a SCADA system used by utilities. Each individual element may include circuitry configured to communicate to other elements or to local/remote servers via the network. The individual elements may be configured to communicate via either wired or wireless communication systems. For example, the individual elements may communicate via dedicated data lines, power lines, mixed power and data (e.g., power over Ethernet) lines, or wirelessly, via WiFi, Zigbee, WiMax, cellular networks, satellite networks, or any other suitable communication system or protocol. The elements may be configured to collect and transmit data to other elements or to local/remote servers. Data about system status, charge status, outage status, and other parameters may be collected and/or transmitted. For example, if a power outage is detected, notifications may be sent to the utility and/or a third-party, e.g., a caretaker or a local emergency response team. Instructions may be provided to individual elements via the communication links, and individual elements may include circuitry configured to execute received instructions.

Figure 4:
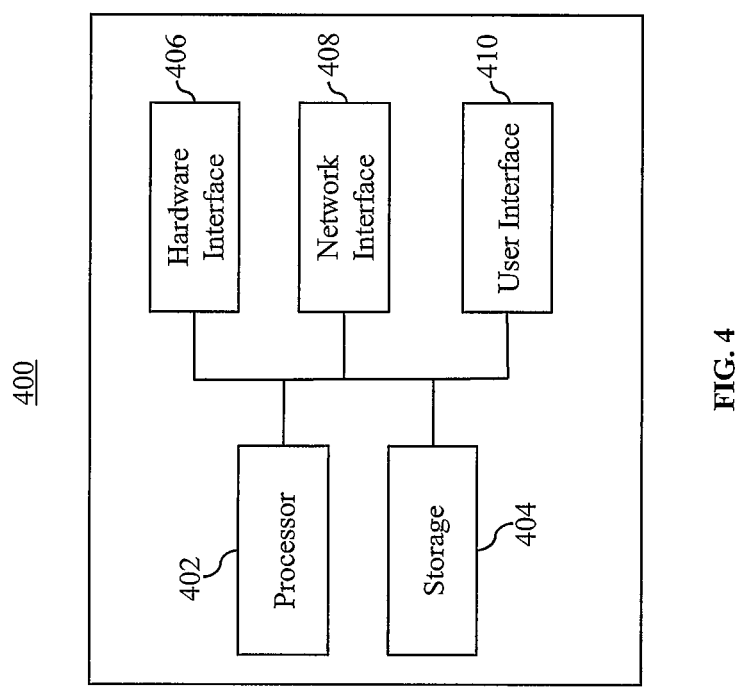
FIG. 4 is a diagram of a system controller according to a preferred and non-limiting embodiment of the invention.

FIG. 4 depicts an example system controller 400, similar to controller 104 described above in relation to FIGS. 1-3. The system controller 400 comprises at least one processor 402 and a storage unit 404, which includes at least one random access memory (RAM), at least one read-only memory (ROM, PROM, EPROM, EEPROM, or flash ROM), and/or one or more data storage devices (not shown). The system controller 400 also includes at least one network interface unit 408, a user interface unit 410, and a hardware interface unit 406. All of these latter elements are in communication with the processor 402 to facilitate the operation of the system controller 400. The controller 400 may be configured in many different ways. For example, controller 400 may be configured to operate in a standalone fashion or, alternatively, the function of controller 400 may be distributed across multiple processor systems and architectures. The various components of the system controller 400 may be disposed locally or remotely from each other.

System controller 400 may be configured in a distributed architecture, wherein databases and processors are housed in separate units or locations. Some such units perform primary processing functions and contain at a minimum, a general controller or a processor 402 and a storage unit 404. Each unit may be attached via the network interface unit 408 to a communications hub or port (not shown) that serves as a primary communication link with other servers, client or user computers, and other related devices. The communications hub or port may have minimal processing capability itself, serving primarily as a communications router. A variety of communications protocols may be part of the system, including but not limited to: Ethernet, SAP, SAS™, ATP, BLUETOOTH™, Zigbee, GSM, and TCP/IP.

The processor 402 may include one or more microcontrollers, microprocessors, and/or supplementary co-processors, e.g., math co-processors. For example, a PIC microcontroller manufactured by Microchip Technology Inc, Chandler, Ariz., may be used. However, any other suitable controller, microcontroller, processor, or microprocessor may be used. The processor 402 is in communication with the network interface unit 408 and the user interface unit 410, through which the processor 402 communicates with other devices, e.g., servers, user terminals, or devices. The network interface unit 408 and/or the user interface unit 410 may include multiple communication channels for simultaneous communication with, for example, other processors, servers, or client terminals. Devices in communication with each other need not be continually transmitting to each other. On the contrary, devices in communication with each other need only transmit to each other as necessary, may actually refrain from exchanging data most of the time, and/or may require several steps to be performed to establish a communication link between the devices.

The processor 402 is in communication with the user interface unit 410, which enables a user or consumer to interact with or view data about the system controller 400 and/or the overall system. The user interface unit 410 may include devices for displaying or providing data to a user, e.g., a video display (e.g., CRT, LCD, dot matrix LCD), audio speakers, indicator lights, or any other suitable output device. The user interface unit 410 may also include input devices with which a user may interact with the system controller 400 and/or the overall system. For example, input devices may include keyboards, buttons/pushbuttons, keypads, touchscreens, switches, pointing devices (e.g., mice, trackballs, joysticks, touchpads), microphones (for, e.g., voice recognition), or any other suitable input device. The user interface unit 410 may also include one or more audio or visual alert/alarm devices, e.g., a bell, buzzer, siren, flashing light, or any other suitable audio/visual device. The user interface unit 410 may be disposed remote to the system controller 400. For example, a consumer may interact or interface with the system controller 400 and/or the processor 402 via a remote interface, e.g., a web portal or an application on a portable or remote communication device.

The processor 402 communicates with a hardware interface unit 406, via which the processor 402 may provide instructions to various hardware components of a power distribution system. For example, the hardware interface unit 406 may be configured to communicate with energy storage system 106, thermostats 218-222, safety switch 206, switches 224-240, or any other component of the heating plant or the heating system 200. The processor 402 may be configured to communicate directly with the aforementioned system components.

The processor 402 is also in communication with the storage unit 404. The storage unit 404 may comprise an appropriate combination of magnetic, optical, and/or semiconductor memory, and may include, for example, RAM, ROM, flash drive, an optical disc, e.g., a compact disc, and/or a hard disk or drive. The processor 402 and the storage unit 404 each may be, for example, located entirely within a single computer or other computing device, or connected to each other by a communication medium, e.g., a USB port, serial port cable, a coaxial cable, an Ethernet type cable, a telephone line, a radio frequency transceiver, or other similar wireless or wired medium or combination of the foregoing. For example, the processor 402 may be connected to the storage unit 404 via the network interface unit 408.

The storage unit 404 may store, for example, (i) an operating system for the system controller 400; (ii) one or more applications (e.g., computer program code and/or a computer program product) adapted to direct the processor 402 as described herein, particularly in accordance with the processes described in detail with regard to the processor 402; and/or (iii) database(s) adapted to store information that may be utilized to store information required by the program.

The operating system and/or applications may be stored, for example, in a compressed, an uncompiled, and/or an encrypted format, and may include computer program code. The instructions of the program may be read into a main memory of the processor from a computer-readable medium other than the storage unit 404. While execution of sequences of instructions in the program causes the processor 402 to perform the process steps described herein, hard-wired circuitry may be used in place of, or in combination with, software instructions for implementation of the processes of the present invention. Thus, preferred and non-limiting embodiments of the present invention are not limited to any specific combination of hardware and software.

Suitable computer program code may be provided for performing numerous functions, for example, generating dynamic driver profiles, evaluating driver behavior, selecting feedback modes, and generating feedback. The program also may include program elements such as an operating system, a database management system, and "device drivers" that enable the processor to interface with computer peripheral devices (e.g., a video display, a keyboard, a computer mouse, etc.) via user interface 410.

The term "computer-readable medium" as used herein refers to any medium that provides or participates in providing instructions to the processor of the computing device (or any other processor of a device described herein) for execution. Such a medium may be non-transitory and take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 402 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic, or optical signals, which are exemplary forms of wireless communications or data streams that carry various types of information.

Figure 5:
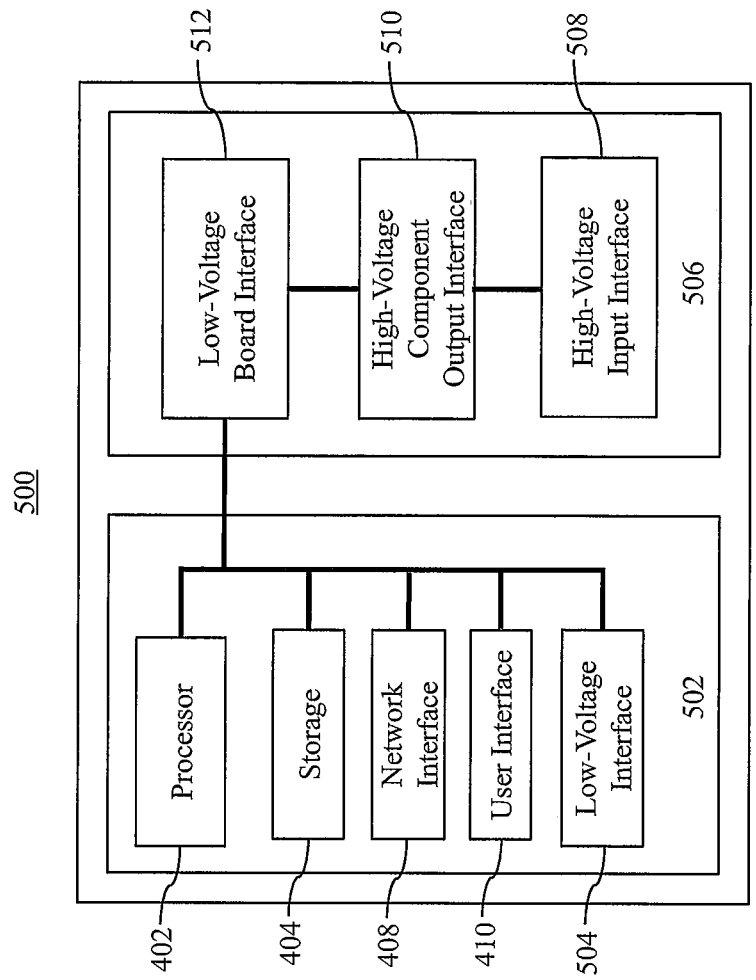
FIG. 5 is a detailed diagram of a system controller according to another preferred and non-limiting embodiment of the invention.

FIG. 5 is a schematic view of an example system controller 500, according to a preferred and non-limiting embodiment. Controller 500 is similar to controllers 104 and 400 (FIGS. 1 and 4). Various components on the system controller 500 are physically segregated on different portions of the controller, e.g., on different printed circuit boards (PCBs), to isolate components that operate with different voltages from one another. For example, logic or other components that operate with relatively low voltages (less than about 12V) may be separated from components that operate with higher voltages (greater than nominal 50VDC or 24 VAC) so that circuitry or wiring problems do not lead to potentially catastrophic problems (e.g., 120V inadvertently applied across a component only rated for 5V). The system controller 500 may include a low-voltage board 502. Components on the low-voltage board 502 include processor 402, storage 404, network interface 408, and user interface 419, similar to the corresponding components discussed above with respect to FIG. 4. The low-voltage board 502 may also include a low-voltage interface 504 for communicatively coupling with heating system components that operate with low voltages. For example, thermostats 218-222 and zone valves 212-216 (FIGS. 2-3) may operate with low voltages, and the system controller 500 may control/communicate with these thermostats via the low-voltage interface 504.

The system controller 500 may include a high-voltage board 506. The high-voltage board 506 includes a high-voltage input interface 508, and high-voltage component output interface 510, and a low-voltage board interface 512, via which circuitry on the low-voltage board 502 control/communicate with components on the high-voltage board 506. High-voltage components in a heating system such as heating system 200 may include heating plant components such as the boiler 208, the circulator pump 210, and line-voltage thermostats 218-222 or line-voltage zone valves 212-216. The consumer energy storage system 106 may operate at high voltage. Power flow to heating system components may pass directly through the system controller 500, for example, via the high-voltage input and output interfaces 508 and 510. For example, the high-voltage input interface 508 may include a switch (e.g., switch 226, FIG. 2) through which power flows from the power grid 102 (FIG. 2) to the energy storage charger 202. Similarly, any of switches 224-240, through which power flows to various components of the heating system, may reside on the high-voltage board 506, either as part of the high-voltage input interface 508 or part of the high-voltage output interface 510. Switches that control power flow to heating plant components, e.g., switches 230-240, may be part of high-voltage output interface 510, and switches that control power flow from the grid 102 to the energy storage subsystem 106 (e.g., switch 226, FIG. 2) may reside on the high-voltage input interface 508. The high-voltage board 506 may include connections to other heating system components, for example, the energy storage charger 202 and/or the inverter 204.

Figure 6:
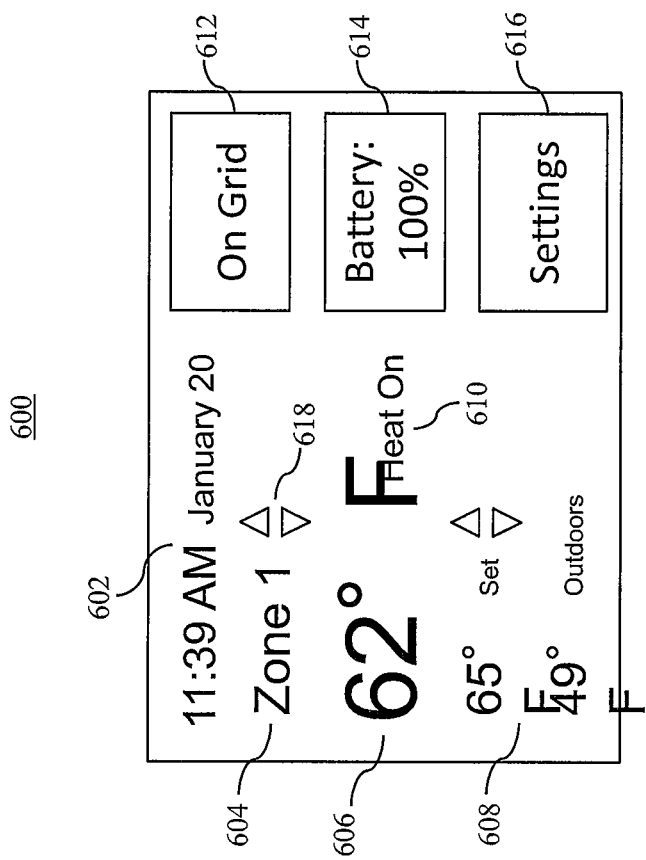
FIG. 6 depicts a system-level user interface for a home heating system according to a preferred and non-limiting embodiment of the invention.

FIG. 6 depicts a user interface 600 for a home heating system according to a preferred and non-limiting embodiment. The user interface 600 enables a consumer to view temperature and other environmental parameters, as well as general system settings and parameters. The user interface 600 enables a consumer to change temperature and heating system settings. The user interface 600 may be generated at the heating system (e.g., by the system controller 104) and presented to the consumer on a user interface unit, e.g., user interface unit 410 (FIGS. 4, 5). For example, the user interface 600 may be displayed on a display device local to the system controller 104 (FIG. 1). The user interface 600 may be displayed as a network portal on a stationary display device/user interface hardware and/or on a portable consumer device, e.g., a PDA, a tablet computer, a notebook computer, or a smartphone.

The user interface 600 includes one or more information display areas 602-616, each of which may also function as an input area for display devices capable of direct user input, e.g., touch screens. The user interface 600 may include a time display area 602, which shows the current time and date at the consumer location. The user interface 600 also includes temperature and environmental information display areas 603-610. The current heating zone for which information is being displayed is shown in information display area 604, and scroll up/down icon 618 may be actuated, either directly by the consumer in a touchscreen-type display or indirectly via other input devices to change the currently viewed heating zone. Information display area 606 shows the current temperature in the currently selected heating zone, and information display area 608 shows the current temperature setpoint in the current heating zone as well as the outdoor temperature. Similar to information display area 604, the current temperature setpoint may be changed by actuating the icon next to it, similar to icon 618. Information area 610 indicates that the current heating zone is being heated, and information display areas 612 and 614 display the operating status of the heating system (612) and the current state of battery charge (614). Information display area 616 is also a "button" that allows the user to view and modify other heating system and connected device settings. In the preferred embodiment, button 618 allows the user to view device status and change settings, which may include priority levels and trade-off or shut-off criteria to be implemented as the energy storage system approaches full depletion during an extended power outage, associated with any connected device (such as critical device(s) 110, FIGS. 1-3) managed by the controller.

The consumer may modify the format as well as the information presented by the user interface 600. For example, different information may be displayed in different information display areas, and information display areas may be moved around on the display according to the consumer's needs. It should be understood that the display areas depicted in user interface 600 are merely illustrative, and that any display or interface scheme capable of providing information to and receiving input from the user may be used, and is within the scope of this invention.

Figure 7:
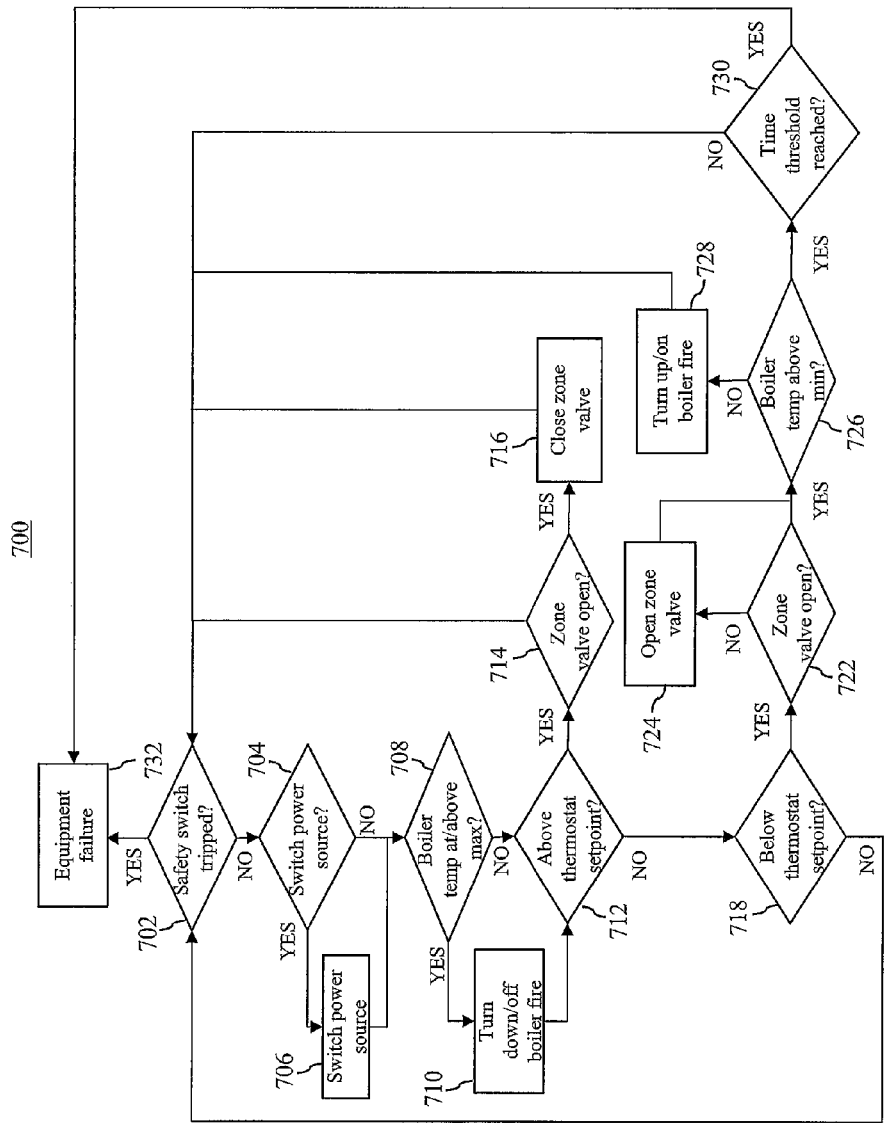
FIG. 7 is a flowchart depicting an illustrative home heating system operation process at a system level according to a preferred and non-limiting embodiment of the invention.

FIG. 7 is a flowchart depicting an illustrative heating system operation process 700 according to a preferred and non-limiting embodiment. The heating system operation process 700 may be performed by the system controller 104 (FIGS. 1-3), or by the boiler 208 (FIG. 3).

The operation process 700 begins at step 702, where the system determines if a safety switch, e.g., safety switch 206 (FIGS. 2-3) has been tripped. Safety switches may be configured to trip if certain heating system parameters cross —upward or downward —predetermined thresholds. For example, safety switch 206 (FIGS. 2-3) may be configured to trip when the water level in the heating plant drops to below a predetermined threshold, or if the temperature of the heating system and/or the boiler 208 (FIGS. 2-3) exceeds a predetermined threshold. Safety switches may also trip if the heating system is otherwise normal but one or more safety switches are malfunctioning. If a safety switch is tripped, then the process moves to step 732, and the heating system shuts down due to equipment failure. If this occurs, the heating system may need physical repairs before coining online again to prevent re-tripping of the safety switch(es). An audio or visual alarm or alert may be provided to the consumer if any safety switch is tripped.

If no safety switches are tripped, then the process moves to step 704, where the system determines if the heating system power source should be switched. While in some embodiments, the heating system operates entirely from an energy storage system (e.g., energy storage subsystem 106, FIGS. 1-3), which in turn is charged from the power grid (e.g., power grid 102, FIGS. 1-3), in other embodiments, for example, as shown in FIGS. 2-3, the heating system may operate from an energy storage system or from the power grid, as discussed above in relation to switch 224 in FIG. 2. If the heating system operates from an energy storage system or from the power grid, or if an outage on the power grid is detected, the heating system switches to power from the energy storage system (step 706). Similarly, if the heating system has been operating solely on stored power, perhaps due to a previous outage, if the heating system detects that the power grid has come back online, it may switch back to grid power (step 706). A notification may be sent to the consumer or a third party, e.g., a caretaker, a home security provider, or a utility. For example, the heating system may notify a utility that a power outage has been detected. As another example, if the heating system is installed in the residence of an elderly or disabled person, or if the system is configured to power a critical device (e.g., critical device 110, FIGS. 1-3), e.g., a ventilator, dialysis machine, or other medically necessary device, a notification may be sent to a caretaker or an emergency response team. If the heating system detects an outage condition, it may provide an audio and/or visual alarm or alert to the consumer.

After any power source switching, if necessary, has been performed, the system determines in step 708 if the boiler or heating system temperature is at or above a maximum limit. If this is the case, the system turns the boiler down or off in the following step, step 710. The command to turn the boiler off/down due to a maximum temperature being reached supersedes/overrides a command to turn the boiler on/up due to open zone valves or thermostat-detected temperature mismatches.

The system proceeds in steps 712 and 718 to determine if any thermostats register a temperature mismatch. For example, a thermostat reading a temperature in a heating zone that is higher than or lower than a set temperature threshold registers a temperature mismatch. If no thermostats register a mismatch, the process returns to step 702, where the system is checked for other problems. Other problems may include, among other things, failure to detect heating zone temperature increase even with open zone valves and fired boiler, or other heating system component failures not caught by safety switches. If problems have been detected, the process may move to step 714 if the temperature is above the set temperature threshold, and the process may move to step 722 if the temperature is below the set temperature threshold. The heating system may be configured to automatically correct certain problems. For example, the system may correct the problems if possible, and return to step 702. If problem correction is not possible, the process moves to step 714 or 722.

If at least one thermostat registers a temperature mismatch above the set temperature threshold in step 712, the process moves to step 714, where the system determines if the zone valves in the heating system are correctly set. For example, if a particular thermostat indicates that its corresponding heating zone has a higher temperature than its setpoint, the system checks to see if the zone valve corresponding to that heating zone is open or closed, and if not closed, closes the valve in the following step (step 716). The processing returns to step 702 after closing the valve, or if the valve is determined to already be closed. Similarly, if a particular thermostat indicates that its corresponding heating zone temperature is lower than its setpoint in step 718, the system checks to see if the corresponding zone valve is open or closed, and if not open, opens the valve in step 724. The system is capable of opening one zone valve and closing another zone valve, or all other zone valves, at the same time—a circumstance routinely encountered when one zone has priority for heating domestic hot water. If any zone valves are open or are to be opened, the system also turns on a circulator pump, similar to circulator pump 210 (FIGS. 2-3).

After the zone valves have been correctly determined in step 722 or correctly set in step 724, the system checks to see if the boiler is correctly set in step 726. For example, if one or more thermostats had indicated zone temperatures lower than set, and/or if one or more zone valves are open as a result of steps 722/724, the system will check to see if the boiler is on or is turned up. If the system determines that the boiler is not on or is not turned up, e.g., not above a minimum temperature, the system turns the boiler on or turns it up in the following step, step 728. After firing the boiler in step 728, the processing returns to step 702. If, however, the boiler temperature is determined to be above the minimum temperature, the processing may proceed to step 730 to determine if a time threshold has been reached. If the time threshold is not reached, processing returns to step 702. If, however, the boiler temperature is determined to be above the minimum temperature in step 726 and the time threshold is reached in step 730, processing proceeds to step 732 to indicate that an equipment failure has occurred in a zone that is turned on but for some reason has not received enough heat to raise room temperature (for Central Heat (CH)) or water tank temperature (for Domestic Hot Water (DHW)) above that zone's thermostat setpoint. The time threshold value used may be specific to the zone then in process, or may be a single value chosen as the longest expected time required to satisfy a heat call from any zone; for a boiler serving one or more DHW zones in addition to one or more CH' zones, a DHW zone will usually have the longest time threshold.

Application of preferred and non-limiting embodiments to forced hot air heating systems is functionally analogous to the foregoing illustrative applications to hydronic heating systems, albeit with appropriately different furnace components, controllers, and safety devices.

Constant focus on carefully selecting heating system components, supported critical devices, energy storage system components, and supervisory controls for high operating efficiency and low electric power consumption or loss, in contrast to conventional selection for least installed first cost, results in lower operating cost for utility grid power, longer outage duration "run through" capability when the grid is down, and more rapid recovery/recharge of energy storage at the end of power outages. Forced draft sealed-combustion boilers and furnaces, particularly (but not exclusively) modulating-condensing models, typically offer very high fuel-use efficiency as well as lower operating power requirements, and those that also have low water-side (for a boiler) or air-side (for a furnace) head loss offer the best potential for very long off-grid operating duration and excellent overall cost-effectiveness.

Figure 8:
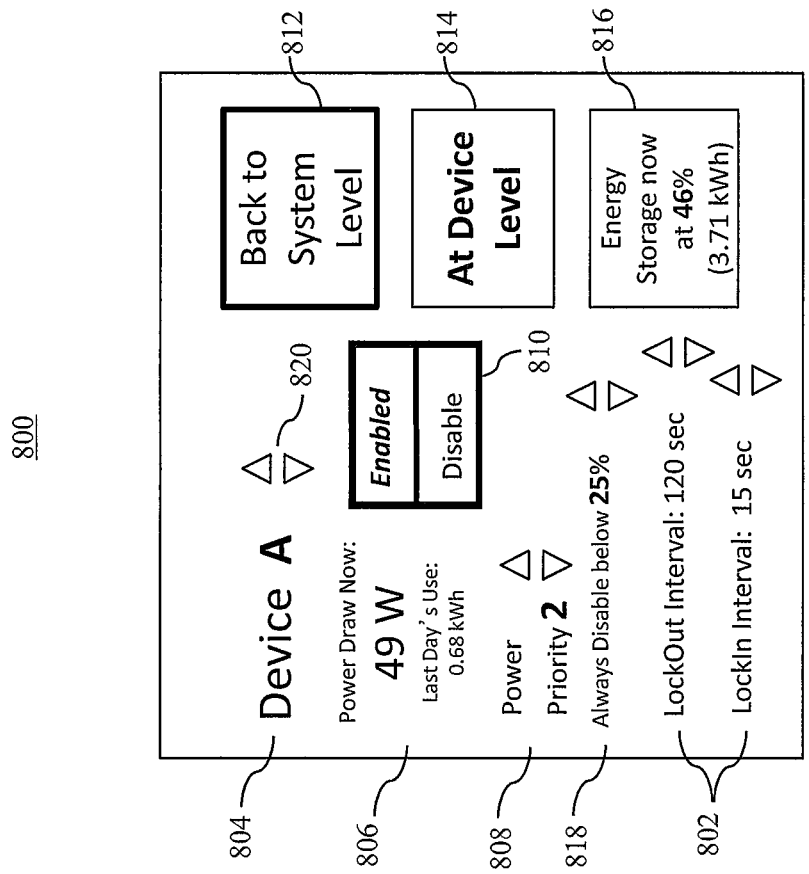
FIG. 8 depicts a device-level user interface for a home heating system, according to an embodiment of the invention.

FIG. 8 depicts a Device Information display screen 800, accessible through the scroll icon 618 or Settings button 616 of User Interface 600, according to a preferred and non-limiting embodiment. The Device Information screen 800 displays a device ID 804, enablement status 810, and power draw 806, as well as the current priority 808 and shutdown 818 settings for a typical connected Critical Device. The level display 814 indicates a current level of the display, e.g., device level or system level, and the back display button 812 enables a user to return to the system display (FIG. 6). LockOut/LockIn Interval indicator and scroll icons 802 enable a user to view current LockOut and LockIn intervals and set or change the LockOut and LockIn intervals.

Priority refers to a user-assigned categorization of devices that the system controller supports up to but not above a category-specific threshold level of available power (not stored energy)—which threshold level has two values: the higher value used when grid power is available up to the capacity of the building's distribution circuit serving the system, and the lower value used during grid outages, when available power is limited to the capacity of a standby generator or the inverter. Shutdown refers to a Disable Below percentage 818 setting capability that allows the user to separately and independently prioritize the low limit of enablement for each connected Critical Device on the basis of available stored energy, a capability that is particularly valuable during long outages as the estimated level of available stored energy displayed 816 on this screen 800 declines. Scroll icons 820 allow the user to scroll through connected devices and confirm or change the priority and shutdown settings for each device. Changes made to device settings through this interface are immediately processed by the system controller as changes to the status file data for each corresponding device.

Accordingly, a priority level of each device includes a first threshold or upper limit value for the device, which is compared to the current system power demand or draw when the controller determines that power from a power source (e.g., grid power) is available, and the device is enabled if the current system power demand or draw is below the threshold of the device (or disabled if the current system power demand or draw is above the threshold of the device), assuming there is no locked-in or locked-out condition for the device, and a priority level of each device includes a second threshold or lower limit value for the device, which is compared to the current system power demand or draw when the controller determines that power from the power source is limited or not available (e.g., the energy storage subsystem is being used to supply power), and the device is enabled if the current system power demand or draw is below the threshold of the device (or disabled if the current system power demand or draw is above the threshold of the device), assuming there is no locked-in or locked-out condition for the device.

The priority level for each device thus comprises two values or thresholds, each value or threshold being an upper limit for instantaneous aggregate system power demand, above which the device is to be disabled so that no power is supplied to the device (even if the internal sensors of the device itself indicate a need for the device to be activated or an internal switch of the device is turned on). The first of the two values or thresholds, which is typically the larger value, applies when grid power is available, and may be determined based on the capacity of the circuit wiring supplying the device with power from the grid connection through the controller. The system controller should have sufficiently capable internal wiring and relays or switches to support at least the highest-power connected device, and the system controller should be placarded to inform the installer and the user of that capability limit. In installations where a standby generator automatically supplies power to the system upon grid power failure, the first priority data value may still apply, because the generator may be specified to have sufficient capacity to satisfy the normal grid-up loads that are to be supplied by the generator through the controller.

System controller capacity is typically not as large as the sum of the power demands of the individual connected devices because duplicating within the system controller the typical over-capacity of installed house wiring is very expensive—particularly because one advantage of the controller lies in its ability to co-ordinate and time-share its smaller capacity to still supply all of its connected loads. The controller coordination reduces peak power demand and saves money for the homeowner whenever momentary or short term peak demand penalty charges apply.

The second of the two priority values, which is typically much lower, applies when grid power (and generator power) are down or unavailable, and aggregate system power demand supplied by the inverter through the controller must be kept below inverter capacity. Inverter capacity typically does not approach or exceed the sum of the individual maximum power demands of all of the connected devices because high-capacity pure sine wave inverters are much more expensive than a smaller inverter plus a controller.

The shutdown or disable below percentage of each device includes a threshold value which is compared by the system controller to the current energy storage level of the energy storage subsystem, and the device is disabled by the system controller if the current energy storage level is below the shutdown threshold of that device (or enabled if the current energy storage level is above the shutdown threshold of that device), assuming no locked-in or locked-out conditions. The shutdown threshold of each device may apply only when grid power is down. After a device has been shut down by the system controller due to the energy storage level falling below the shutdown threshold value of the device, the device may remain shut down until grid power is again available and the aggregate system power demand, typically including AC input power to the energy storage battery charger, is below the grid-up power priority parameter (the first, higher threshold) value for that device.

Enabling a device enables a supply of electric energy to the device. Enabling a device that operates intermittently (e.g., a refrigerator), however, does not imply that the device will immediately demand more than standby power when enabled. Disabling a device immediately cuts off the supply of electric energy to the device, whether the device is active or on standby, e.g., disabling the device is similar to pulling the plug of the device.

Each device may be associated with a lock-in or lock-out condition or duration that can be specified by the user for a particular heating system and/or for each connected device in order to prevent short-cycling of the devices and/or potentially damaging restarts under excessive load. The lock-in or lock-out condition or duration sets a period of time (e.g., a timer) during which the enabled/disabled status of the device cannot be changed. A locked-in device is enabled for the lock-in duration and cannot be disabled until the lock-in duration expires. A locked-out device is disabled (or kept in lower power mode) for the lock-out duration and cannot be enabled (or moved to full power mode) until the lock-out duration expires. Devices may become locked-in for a user-specified duration upon transition from low-power standby mode (if any) to full-power operating mode, or locked-out for a user-specified duration on transition from a full-power to low-power or no-power (grid dropout) mode, using duration data from the device status file, as may be modified by inputs from the Device-level interface screen 800.

To ensure operating safety, maintain controller stability, and prevent inefficient or potentially harmful short-cycling of the heating system or connected critical devices, two moving-average values—one shorter-term for total power draw and the other longer-term for energy storage level—are calculated by the system controller and continuously updated, with the value of individual energy storage level set at each sampling interval based upon an adaptive model using battery terminal voltage and total power draw data taken at that interval, in combination with the most recent moving average values.

Inverters have short-term surge capacity ratings well in excess of their continuous (100%) ratings; values such as 150% for one minute and 200% for five seconds are reasonably common. In choosing the time-span or "window" for continuously updating short-term average for total power draw, the system controller takes such surge capacity and duration characteristics into account.

Figure 9:
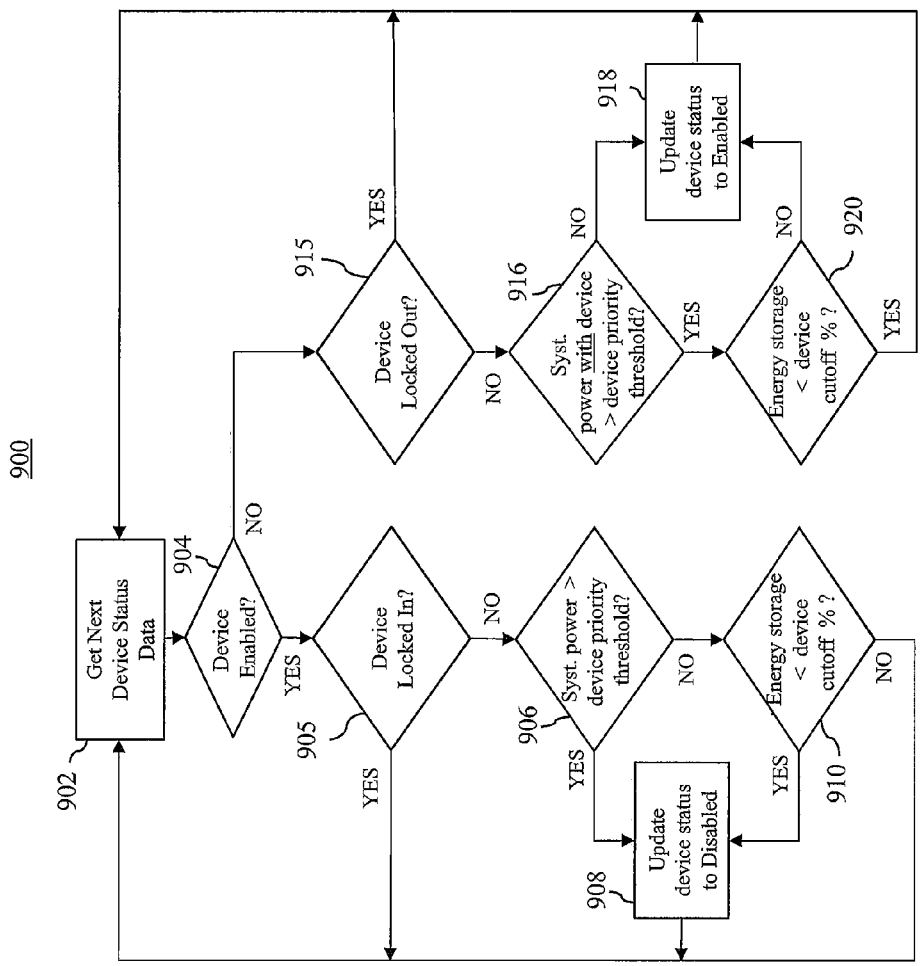
FIG. 9 is a flowchart depicting an illustrative home heating system operation process at a device level according to a preferred and non-limiting embodiment of the invention.

A device-enable/disable routine as illustrated in FIG. 9, discussed below, may nevertheless work rapidly enough to prevent damage to the inverter and/or charger during momentary and brief grid dropouts and reconnections—lasting from less than one second to the electric utility-standard distribution circuit breaker first reclosing interval of fifteen seconds. This can be accomplished by setting the default status of every device to Disabled whenever the grid drops out, with each device then subject to its own tabulated Safety Lock-out interval. Longer lockouts—on the order of 200 seconds—may be required for motor-driven devices, particularly any having air or vapor compressors that cannot start against full operating pressure. The heating plant also typically needs a lock-in interval whenever a heat or DHW call initiates in order to ensure proper pre- and post-purging of the fuel burner. Satisfying overlapping lock-in constraints for the heating plant and high-priority connected devices may require an inverter having greater capacity than would otherwise be appropriate for a system of any particular energy storage capacity.

Controller enabling/disabling of devices to prevent short-cycling damage is also advantageous for residential applications should an episode of multi-user "thermostat war" or "device priority war" conflict happen to occur. An appropriate post-operation lock-out interval for each connected device may be implemented to protect against such user abuse.

Defaulting every device to locked-out in case of grid dropout and at the end of a normal operating interval is doubly advantageous, because it protects both the heating system and the connected devices against both overloads and inadvertent damage, whether due to grid transients, operator ignorance, or mindless abuse. The service lifetimes of connected devices that include motor-driven loads—such as stationary oxygen concentrators, all types of refrigerators and freezers, air conditioners, and dehumidifiers—can be significantly extended by such protection.

FIG. 9 is a flowchart depicting an illustrative complementary process 900 for monitoring and controlling the provision of power to connected critical devices according to a preferred and non-limiting embodiment. The power provision operation process 900 may be performed by the system controller 104 (FIGS. 1-3). The process 900 may execute or run continuously, but relatively slowly (so as to conserve energy), in the background whenever the system is energized. The process initiates at step 902 and obtains status data for whichever device succeeds the last device processed. In step 904, processing proceeds to determine whether the current device is presently Enabled or Disabled, and the process proceeds on one of two parallel paths, each subject to an initial check as to whether the device is presently Locked In (step 905) or Locked-Out (step 915) to ensure operating safety. Lock-In and Lock-Out durations can be specified by the user for a particular heating system and/or for each connected device in order to prevent short-cycling of devices and/or potentially damaging restarts under excessive load. Devices become Locked-In for a user-specified duration upon transition from low-power standby mode (if any) to full-power operating mode, or Locked-Out for a user-specified duration on transition from a full-power to low-power or no power (grid dropout) mode, using duration data from the device status file, as may be modified by inputs from the Device-level interface screen 800.

For an Enabled device that is not presently Locked-In, step 906 checks whether present system power draw exceeds the device Priority threshold, and if so, disables the device by updating its file data in step 908 for subsequent action by the higher level system controller. Processing then returns to step 902. If system power does not exceed the device Priority threshold, step 910 checks whether the present level of Energy Storage is below the device Cutoff setting, and if so, step 908 updates the device status file data to Disabled. Processing then returns to step 902. A complementary parallel process occurs if, in step 904 the device is determined to be Disabled (not enabled) and in step 915 to be not Locked-Out, with device Priority threshold and Energy Storage cutoff setting used in steps 916 and 920, respectively, to determine whether the device status data is to be changed to Enabled by step 918. For example, if the system power with device is not greater than the device priority threshold, processing proceeds to step 918 and the device status is updated to Enabled. If the system power with device is greater than the device priority threshold, processing proceeds to step 920 to determine if the energy storage is greater than the device cutoff percentage, and if not, processing proceeds to step 918 and the device status is updated to Enabled. Both parallel process branches return to step 902 for monitoring and possible updating of critical device status data.

Process 900 is a power dispatch process, not an electrical-safety related process; enabled connected devices are conventionally protected by supply circuit fuses or circuit breakers, and by their own internal protective components, if any. Process 900 monitors total system power draw and compares the total system power draw to the present power source capacity, priority thresholds, and energy storage level for comparison with device cutoff percentages in order to set enable or disable status indicators of individual connected devices for higher level control processing.

The system controller 104 may incorporate and use other processes during initial set-up and/or from time to time during periods of grid-up operation to receive, establish, or confirm nominal device power draw in normal and standby modes in order to determine and store device data and parameters for use in modifying device operating priorities during grid-outage operation on inverter power or DC power directly from stored energy.

If standby generator power is available either continuously or temporarily during grid outages, the system controller 104 may incorporate a variant of Process 900 and be configured to dispatch generator power, as an alternative to inverter power, directly to connected critical devices such that the nominal capacity of the generator is not exceeded. This capability is advantageous because installed standby generator capacity is typically greater than backup inverter capacity; during intervals when power drain of heating system and connected device calls is less than generator capacity, the difference can be used to charge the energy storage subsystem. Further backup, using stored energy and therefore limited to inverter capacity, remains available in the event of standby generator malfunction or failure.

As noted with regard to inverter overload capacity in the discussion of FIG. 8, generators have overload capacity ratings which decrease with the duration of overload. As the overload capacity ratings are typically different from inverter overload capacities, the system controller 104 for a system served by a standby generator may use a different set of overload/duration parameters when operating on generator power than when operating on stored energy, and may also use a different time interval "window" for determining the shorter time-average power draw in order to properly protect the generator against excessive overload.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A building backup electric power supply system for use during the loss of a primary electric power system, comprising:
an energy storage system for use when the primary electric power system is subject to interruption or degradation, and an inverter for converting the stored energy from DC to AC; and
a programmable controller for switching from the primary electric power system to the energy storage system during times of interruption or degradation of the primary electric power system, said controller being configured so as to allow a user to set priorities for each of the building loads that may be powered by the energy storage system under different circumstances,
wherein the prioritized building loads correspond to different equipment powered by the energy storage system.

2. The system of claim 1, wherein the primary electric power system is the utility power grid, and wherein the energy storage system is at least one battery, and said at least one battery is connected to and kept charged by the primary electric power system during periods of uninterrupted power service from the primary electric power system.

3. The system of claim 1, wherein the energy storage system is connected to one or more solar panels for charging said energy storage system during periods of solar activity.

4. The system of claim 1, wherein the energy storage system is connected to a fossil fuel powered electric generator for charging said energy storage system.

5. The system of claim 1,
wherein the controller implements operating priorities in accordance with user inputs including the importance of each building load to the building occupants, the real time power demand of the prioritized building loads, and the duty cycle of each of the prioritized building loads compared with the level of stored energy remaining in the energy storage system,
wherein the controller is configured to allow the user to update or modify the building loads that may be powered by the energy storage system and update or modify the priority assigned to each building load at any time,
wherein the controller is configured to implement operating priorities for a heating system on the basis of the real power demand of the heating system and other connected equipment relative to the capacity of the energy storage system then in use and/or the level of stored energy remaining in the energy storage system.

6. The system of claim 5, further including a user interface for inputting and displaying a priority level assigned to each building load that may be supplied with power by the energy storage system.

7. The system of claim 6,
wherein the controller calculates the remaining backup hours for the energy storage system based on the presently configured prioritized building loads and the level of stored energy remaining in the energy storage system,
wherein the user interface displays the remaining backup hours for the energy storage system and
wherein the user can enter power outage forecast information, and the controller automatically adjusts the priority of the building loads to increase the period of time that the energy storage system is available in accordance with said forecast,
wherein the user can enter a new priority for a building load and see the impact of the priority change on the remaining backup hours for the energy storage system.

8. The system of claim 7, wherein the building is a residential building and the prioritized building loads include those for a plurality of equipment used for heating, cooling, refrigeration, lighting, entertainment, office, and/or medical purposes, and
wherein each of the plurality of equipment has a shutdown level
wherein the controller is configured to shut down each one of the plurality of equipment for which the amount of energy currently stored in the energy storage system drops below the shutdown level.

9. The system of claim 8,
wherein the controller is connected to a temperature sensor for monitoring a current temperature in at least one heating zone and is configured to disable or reduce heat production from a heating load if the monitored temperature meets a threshold temperature,
wherein the controller is configured to directly provide a portion of the inverter power to prioritized building loads such that the nominal capacity of said loads and said inverter are not exceeded,
wherein at least a portion of the plurality of equipment have a lock-in duration which defines a time period from a prior enablement of the equipment during which the at least a portion of the plurality of equipment cannot be disabled by the controller, and
wherein at least another portion of the plurality of equipment have a lock-out duration which defines a time period from a prior disablement during which the at least another portion of the plurality of equipment cannot be enabled by the controller.

10. The system of claim 1, wherein said controller includes a communications network interface for user interaction with the controller from a remote location via a wireless or wired communications network.

11. A method for providing a building backup electric power supply for use during the loss of a primary electric power supply, comprising:
providing an energy storage system including at least one battery for storing electric power for use when the primary electric power supply is subject to interruption or degradation and an inverter for converting DC to AC;
switching from the primary electric power supply to the energy storage system during times of interruption or degradation of the primary electric power system; and
programming a controller to allow a user to prioritize which building loads are to be served by the energy storage system,
wherein the prioritized loads correspond to different equipment powered by the energy storage system.

12. The method of claim 11, wherein the at least one battery is connected to a plurality of solar panels for charging the batteries during periods of solar activity.

13. The method of claim 11,
wherein the controller implements operating priorities in accordance with user inputs including the importance of each building load to the building occupants, the real time power demand of the prioritized building loads, and the duty cycle of each of the prioritized building loads, compared with the level of stored energy remaining in the energy storage system,
wherein the controller is configured to allow the user to update or modify the building loads that may be powered by the energy storage system and update or modify the priority assigned to each building load at any time,
wherein the controller is configured to implement operating priorities for a heating system on the basis of the real power demand of the heating system and other connected equipment relative to the capacity of the energy storage system then in use and/or upon the level of stored energy remaining in the energy storage system.

14. The method of claim 13, further comprising a user interface for inputting and displaying a priority level assigned to each building load that may be supplied with power by the energy storage system.

15. The method of claim 14,
wherein the controller calculates the remaining backup hours for the energy storage system based on the presently configured prioritized building loads and the level of stored energy remaining in the energy storage system,
wherein the user interface displays the remaining backup hours for the energy storage system and
wherein the user can enter power outage forecast information, and the controller automatically adjusts the priority of the building loads to increase the period of time that the energy storage system is available in accordance with said forecast,
wherein the user can enter a new priority for a building load and see the impact of the priority change on the remaining backup hours for the energy storage system.

16. The method of claim 15, wherein the building is a residential building and the prioritized building loads include a priority of equipment including those used for heating, cooling, refrigeration, lighting, entertainment, office, and/or medical purposes, and wherein each of the plurality of equipment has a shutdown level wherein the controller is configured to shut down each one of the plurality of equipment for which the amount of energy currently stored in the energy storage system drops below the shutdown level.

17. The method of claim 11, wherein said controller includes a communications network interface for user interaction with the controller from a remote location via a wireless or wired communications network.

18. The method of claim 17,
wherein the controller monitors a current temperature in at least one heating zone and disables or reduces heat production from a heating load if the monitored temperature meets a threshold temperature,
wherein the controller is configured to directly provide a portion of the inverter power to prioritized building loads such that the nominal capacity of said loads and said inverter are not exceeded,
wherein at least a portion of the plurality of equipment have a lock-in duration which defines a time period from a prior enablement of the equipment during which the at least a portion of the plurality of equipment cannot be disabled by the controller, and
wherein at least another portion of the plurality of equipment have a lock-out duration which defines a time period from a prior disablement during which the at least another portion of the plurality of equipment cannot be enabled by the controller.

19. An electric power supply system for use during the loss of a primary electric power system, comprising:
an electric energy storage system, connected to the primary electric power system, including at least one battery for storing energy for use when the primary electric power system is subject to interruption or degradation, and an inverter for converting the stored energy in the at least one battery from DC to AC;
a switching system for sensing when the primary electric power system is unavailable or degraded and for then switching over to the energy storage system and for sensing when the primary electric power system is available and for then switching back to the primary electric power system;
a user interface for inputting and displaying a priority level assigned to each building load to be supplied with power by the energy storage system, and
a programmable controller configured to allow a user to set priorities for each of the building loads that may be served by the energy storage system under different circumstances,
wherein the prioritized building loads correspond to different equipment to be powered by the energy storage system,
wherein the controller implements operating priorities in accordance with user inputs including the importance of each building load to the building occupants, the real time power demand of the prioritized building loads, and the duty cycle of each of the prioritized building loads, compared with the level of stored energy remaining in the energy storage system,
wherein the controller is configured to allow the user to update or modify the building loads that may be powered by the energy storage system and update or modify the priority assigned to each building load at any time, wherein the controller is configured to implement operating priorities for a heating system on the basis of the real power demand of the heating system and other connected equipment relative to the capacity of the energy storage system then in use and/or upon the level of stored energy remaining in the energy storage system.

20. The system of claim 19, wherein the building is a residential building and the prioritized building loads include those for a plurality of equipment used for heating, cooling, refrigeration, lighting, entertainment, office, and/or medical purposes, and wherein each of the plurality of equipment has a shutdown level wherein the controller is configured to shut down each one of the plurality of equipment for which the amount of energy currently stored in the energy storage system drops below the shutdown level.

21. The system of claim 20, wherein the controller is configured to monitor a current temperature in at least one heating zone and disable or reduce heat production from a heating load if the monitored temperature meets a threshold temperature, wherein at least a portion of the plurality of equipment has a lock-in duration which defines a time period from a prior enablement of the equipment during which the at least a portion of the plurality of equipment cannot be disabled by the controller, and wherein at least another portion of the plurality of equipment has a lock-out duration which defines a time period from a prior disablement during which the at least another portion of the plurality of equipment cannot be enabled by the controller.

22. The system of claim 21, wherein said controller includes a communications network interface for operation of the controller from a remote location via a wireless or wired communications device.

23. The system of claim 22, wherein the controller calculates the remaining backup hours for the energy storage system based on the presently configured prioritized building loads and the level of stored energy remaining in the energy storage system, wherein the user interface displays the remaining backup hours for the energy storage system and wherein the user can enter power outage forecast information, and the controller automatically adjusts the priority of the building loads to increase the period of time that the energy storage system is available in accordance with said forecast, wherein the user can enter a new priority for a building load and see the impact of the priority change on the remaining backup hours for the energy storage system.

* * * * *